(12) United States Patent
Florez

(10) Patent No.: US 12,466,533 B1
(45) Date of Patent: Nov. 11, 2025

(54) TURBO POWERED PROPULSION DRIVE FOR WATERCRAFTS

(71) Applicant: Carlos Florez, Medley, FL (US)

(72) Inventor: Carlos Florez, Medley, FL (US)

( * ) Notice: Subject to any disclaimer, the term of this patent is extended or adjusted under 35 U.S.C. 154(b) by 0 days.

(21) Appl. No.: 18/781,882

(22) Filed: Jul. 23, 2024

(51) Int. Cl.
| | |
|---|---|
| *B63H 21/21* | (2006.01) |
| *B63B 35/44* | (2006.01) |
| *B63B 49/00* | (2006.01) |
| *B63H 21/20* | (2006.01) |

(52) U.S. Cl.
CPC ............ *B63H 21/21* (2013.01); *B63B 35/44* (2013.01); *B63B 49/00* (2013.01); *B63H 21/20* (2013.01); *B63B 2035/446* (2013.01); *B63B 2035/4466* (2013.01); *B63H 2021/205* (2013.01)

(58) Field of Classification Search
CPC .. B63H 21/21; B63H 21/20; B63H 2021/205; B63B 35/44; B63B 49/00; B63B 2035/446; B63B 2035/4466
USPC .......................................................... 701/21
See application file for complete search history.

(56) References Cited

U.S. PATENT DOCUMENTS

| | | | | |
|---|---|---|---|---|
| 6,766,754 B1 * | 7/2004 | Scott | ........................ | B63B 13/00 114/74 R |
| 6,902,447 B1 * | 6/2005 | Pittman | .................. | B63H 13/00 440/8 |
| 7,775,843 B1 * | 8/2010 | Vanderhye | ............. | B63H 13/00 440/8 |
| 10,137,966 B1 * | 11/2018 | Mills | ........................ | B63B 39/03 |
| 2013/0218377 A1 * | 8/2013 | Murata | ................. | G01C 21/203 701/465 |
| 2014/0071059 A1 * | 3/2014 | Girault | ..................... | B63B 49/00 345/173 |
| 2014/0265335 A1 * | 9/2014 | Andreis | ................ | F03B 17/063 416/210 A |
| 2014/0322996 A1 * | 10/2014 | Nakamura | .............. | F03D 13/22 416/85 |
| 2015/0214862 A1 * | 7/2015 | Dakhil | ..................... | F03B 13/20 416/146 R |
| 2018/0106233 A1 * | 4/2018 | Schneider | .................. | E02B 9/00 |
| 2018/0124557 A1 * | 5/2018 | Bartley | .................... | B63B 49/00 |
| 2018/0258904 A1 * | 9/2018 | Gorman | ............. | F03B 13/1875 |
| 2020/0010151 A1 * | 1/2020 | Zadorozhnyy | .......... | B63H 9/068 |
| 2020/0072183 A1 * | 3/2020 | Chu | ........................ | F03D 9/008 |
| 2021/0246866 A1 * | 8/2021 | Blodgett | ............... | F03B 17/065 |

(Continued)

*Primary Examiner* — Mohamed Abdo Algehaim
(74) *Attorney, Agent, or Firm* — Ruben Alcoba, ESQ.

(57) ABSTRACT

A turbo powered propulsion drive for watercrafts is disclosed. The propulsion drive includes a motor controller attached to a watercraft, which directs power to a permanent magnet synchronous motor with an attached propeller for propulsion. A power distribution unit connected to the motor controller is mounted on the hull. A wind turbine controller and a permanent magnet synchronous motor wind power generator, connected to a vertical axis wind turbine, are also attached to the hull. Additionally, a hydroelectric generator controller and a permanent magnet synchronous motor power generator, coupled to a turbine receiving fluid flow from a penstock water conduit system, are mounted on the hull. An engine control unit is operatively connected to the power distribution unit, ensuring efficient power management and propulsion. This system provides sustainable, emission-free, and low-maintenance propulsion for watercrafts without the need for batteries.

4 Claims, 4 Drawing Sheets

(56) References Cited

U.S. PATENT DOCUMENTS

| | | | |
|---|---|---|---|
| 2023/0349352 A1* | 11/2023 | Lothe | B63H 9/061 |
| 2024/0010320 A1* | 1/2024 | Kusiak | B63J 3/04 |
| 2024/0217628 A1* | 7/2024 | Ito | B60L 53/30 |
| 2024/0280081 A1* | 8/2024 | Yu | F03D 9/008 |

* cited by examiner

TURBO POWERED PROPULSION DRIVE FOR WATERCRAFTS

BACKGROUND

The present invention is directed to a turbo powered propulsion drive for watercrafts.

The introduction of electric motors for powering automobiles, though an age-old concept, has only recently achieved widespread adoption in the $21^{st}$ century. Today, a vast array of fully or partially electric vehicles—from bicycles to buses and trucks—populate our roads. This surge in popularity has necessitated the development of an extensive and costly infrastructure for charging stations, alongside continuous research and development to enhance electricity storage solutions.

This electrification trend has even extended to aviation, with electric airplanes under development and significant investments being made annually to transition all forms of transportation to electric power. However, the maritime sector tells a different story. Despite the availability of technology and basic mechanics for electric watercraft, several challenges have hindered their mass production and adoption.

Key obstacles include the size and weight of batteries, limited range, lack of charging stations on waterways, and the inherent incompatibility of water and electricity. Consequently, the production of electric watercraft remains minimal, and boating continues to rely heavily on fuel, contributing to environmental pollution and high maintenance costs.

Thousands of mechanical parts in internal combustion engines increase the risk of breakdowns and environmental contamination. Modern technology in this domain has primarily focused on developing more complex, noisy, and costly machines that are expensive to operate and maintain. While electric vehicle (EV) technology progresses on land, the unique challenges of boating, particularly in open ocean environments, have been largely overlooked.

Key challenges include: 1. Corrosion: Water, especially saltwater, is highly corrosive. Effective waterproofing and insulation are critical for developing electric boats (EB); 2. Bumpy Rides: Watercraft experience rougher conditions compared to land vehicles, posing challenges for the durability of enclosures, mounting hardware, and mechanisms; 3. Lengthy Trips: Unlike land commutes, boating trips can be lengthy, and the faster a boat goes, the quicker it drains its battery. Running out of power miles from shore is a serious concern; and 4. Lack of Charging Stations: The complete absence of charging infrastructure on waterways is a significant barrier.

Despite these challenges, electric boats offer benefits such as fewer moving parts, reduced maintenance costs, and advancements in electronics that simplify power management. Additionally, there is a growing market for power trains capable of replacing combustion engines in boats.

In 2022, approximately 11.77 million recreational vessels were registered in the United States, with an estimated 4 million unregistered. Over 100 million Americans engage in boating annually, underscoring the need for innovation in this sector. Small watercraft typically consume 6 to 8 gallons of fuel per hour, while larger vessels use 20 to 30 gallons per hour, cumulatively resulting in millions of gallons of fuel consumed annually and significant environmental impact.

The Turbo Power Propulsion Drive (TPPD) of the present invention aims to address these issues by providing a sustainable, fully electric propulsion system that eliminates the need for batteries. This invention leverages the two most abundant elements around a watercraft: water and wind.

Water: Similar to large hydroelectric plants that generate electricity by channeling water through turbines, the TPPD uses this principle to generate power for the vessel.

Wind: Drawing inspiration from windmills that convert wind energy into electricity, the TPPD incorporates this technology to further enhance its power generation capabilities.

The inventor of the present application has over 40 years of boating experience He designed the TPPD to create a redundant system capable of generating sufficient electricity to power a vessel's drivetrain without relying on batteries. This innovation promises to revolutionize the maritime industry by offering an environmentally friendly, cost-effective, and reliable propulsion solution for watercraft.

SUMMARY

The present invention, the turbo powered propulsion drive (hereinafter TPPD) for watercrafts, is an innovative and sustainable electric propulsion system designed to drive watercrafts, including both existing vessels and newly constructed ones. The TPPD replaces traditional combustion engines with a fully electric propulsion system that utilizes a combination of wind and hydroelectric power generation, thereby eliminating the need for batteries and producing zero emissions.

The primary objective of the TPPD is to provide a reliable and environmentally friendly powertrain for watercrafts that offers minimal maintenance costs and extends the operational range of boats. The system is designed to ensure continuous power generation, enabling vessels to operate for unlimited distances and durations without relying on battery power.

The key Components of the present invention are as follows: 1. Motor Controller: The motor controller is securely attached to the watercraft and is responsible for directing power to a permanent magnet synchronous motor. This motor, equipped with an attached propeller, propels the watercraft efficiently and effectively; 2. Power Distribution Unit: Mounted on the hull of the watercraft, the power distribution unit connects operatively to the motor controller and manages the distribution of generated power throughout the system; 3. Wind Turbine Controller: Also attached to the hull, the wind turbine controller is connected to the power distribution unit and regulates the power generated by the wind turbine; 4. Permanent Magnet Synchronous Motor Wind Power Generator: This generator is connected to the power distribution unit and is driven by a vertical axis wind turbine, which is installed on the upper section of the watercraft. The wind turbine harnesses wind energy to generate electrical power; 5. Hydroelectric Generator Controller: Positioned on the hull, this controller is connected to the power distribution unit and manages the power generated by the hydroelectric system; 6. Permanent Magnet Synchronous Motor Power Generator: Connected to the hydroelectric generator controller, this generator is driven by a turbine that receives fluid flow through a penstock water conduit system attached to the lower section of the watercraft. This configuration ensures efficient hydroelectric power generation; and 7. Engine Control Unit: This unit is operatively connected to the power distribution system and oversees the overall functionality and efficiency of the propulsion drive.

The present invention leverages the most abundant natural resources available to watercrafts—wind and water. By integrating advanced electric motor technology with innovative power generation methods, the TPPD provides a sustainable alternative to traditional marine propulsion systems. This invention not only reduces environmental impact but also enhances the reliability and performance of watercrafts, marking a significant advancement in maritime technology.

The present invention can be an add-on to watercrafts. Installation of the present invention will require a minimum of changes to the hull structure of the watercraft in which it can be installed.

An object of the present invention is to provide a new watercraft propulsion system that will not impact the environment and that is sustainable.

Another object of the present invention is to provide a new watercraft propulsion system that will not rely on fossil fuels.

BRIEF DESCRIPTION OF THE DRAWINGS

These and other features, aspects, and advantages of the present invention will become better understood with regards to the following description, appended claims, and drawings where:

DESCRIPTION

Figure 1:
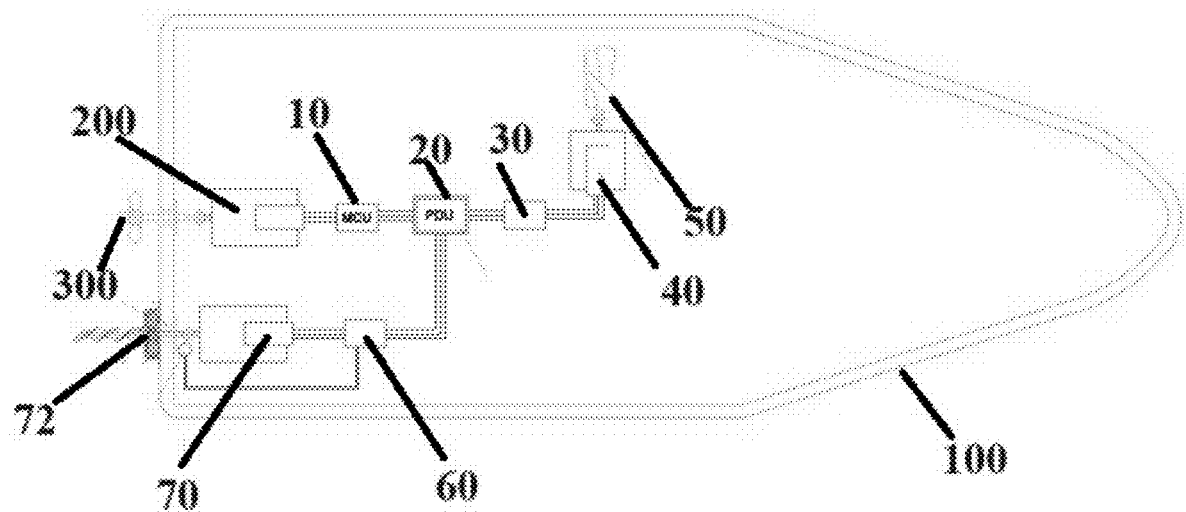
FIG. 1 is a top view diagram of a watercraft that shows the present invention.
Figure 2:
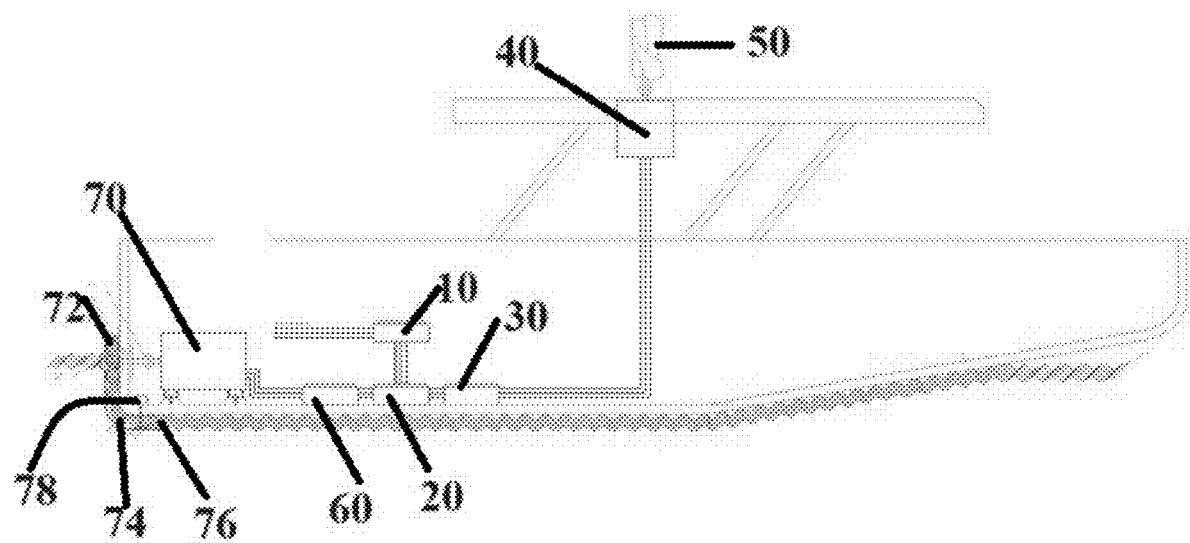
FIG. 2 is a side view diagram of the watercraft that shows a possible layout of the elements of the present invention.
Figure 3:
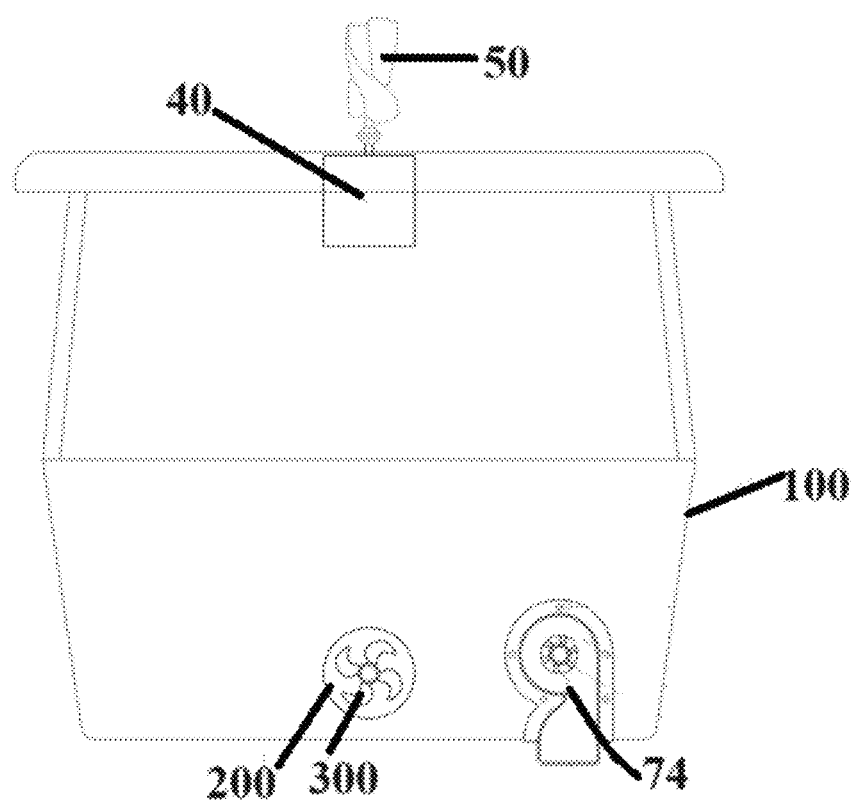
FIG. 3 is a rear view diagram of the watercraft that shows a few elements of the present invention.
Figure 4:
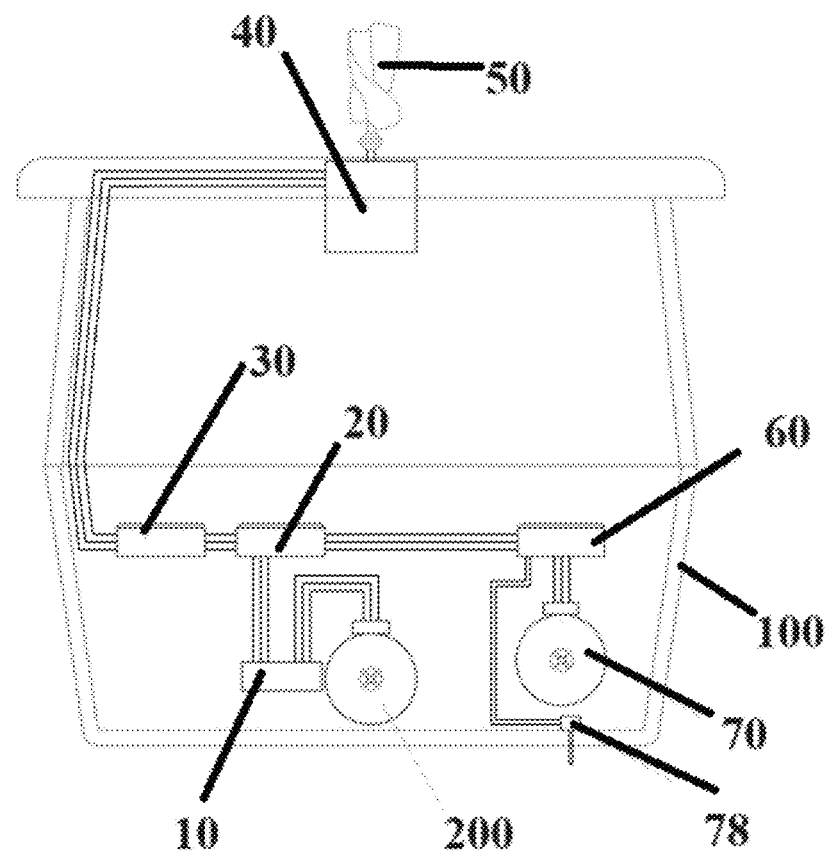
FIG. 4 is a diagram of the present invention within the watercraft.
Figure 5:
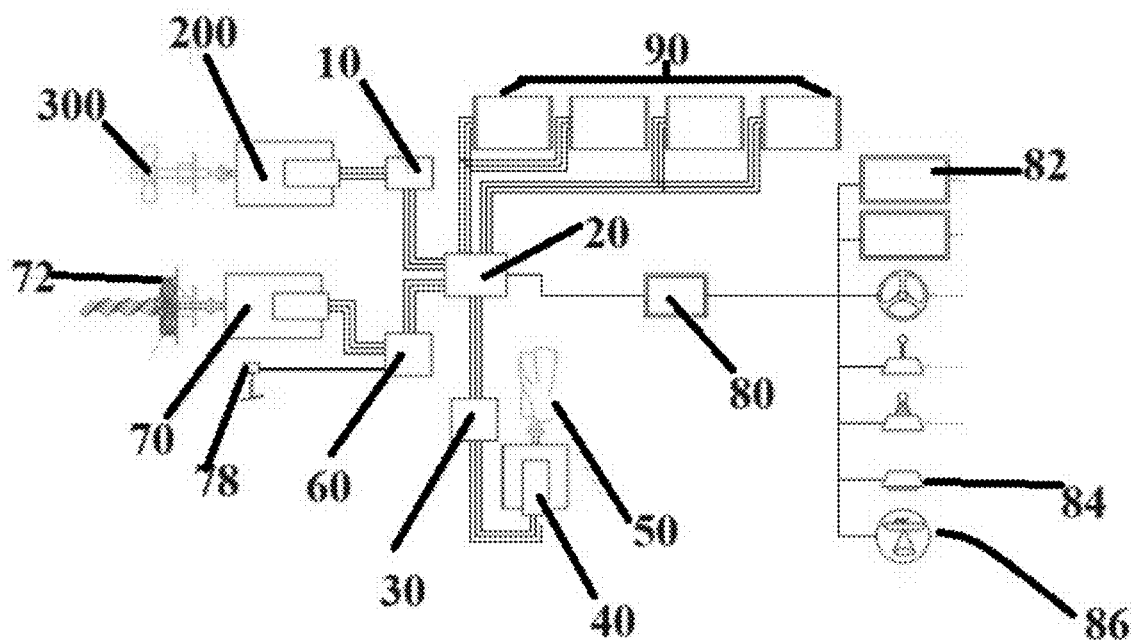
FIG. 5 is an electrical diagram that shows how the elements of the present invention are operatively connected.

As seen in FIGS. 1-5, the present invention is a turbo powered propulsion drive for watercrafts.

The turbo powered propulsion drive comprises a motor controller 10 that is attached to a watercraft 100, the motor controller 10 directs power to either a permanent magnet synchronous motor 200, an inboard motor 200, a stern drive motor 200, or an outboard motor 200 of the watercraft 100 to propel the watercraft 100, a propeller 300 is attached to either the permanent magnet synchronous motor 200, the inboard motor 200, the stern drive motor 200, or the outboard motor 200 of the watercraft 100, the propeller 300 propels the watercraft 100. A power distribution unit 20 that is attached to a hull of the watercraft 100, the power distribution unit 20 is operatively connected to the motor controller 10. A wind turbine controller 30 that is attached to the hull, the wind turbine controller 30 is operatively connected to the power distribution unit 20. A permanent magnet synchronous motor wind power generator 40 that is attached to the watercraft 100, the permanent magnet synchronous motor wind power generator 40 is operatively connected to the power distribution unit 20. A vertical axis wind turbine 50 that is attached to an upper section of the watercraft, the vertical axis wind turbine is operatively connected to the permanent magnet synchronous wind power generator 40. A hydroelectric generator controller 60 that is attached to the hull, the hydroelectric generator controller 60 is operatively connected to the power distribution unit 20. A permanent magnet synchronous motor power generator 70 that is attached to the hull, the permanent magnet synchronous motor power generator 70 is operatively connected to the hydroelectric generator controller 60. A turbine 72 is coupled to the permanent magnet synchronous motor power generator 70, the turbine 72 receives a fluid flow from a penstock water conduit system 74 that is attached to an outer lower section 100a of the watercraft 100. And, an engine control unit 80 that operatively is connected to the power distribution unit 20.

In an embodiment of the present invention, the engine control unit 80 is comprised of a multi-function display 82 that is touch screen and that allows the watercraft 100 to be controlled, a radar 84, and a depth finder 86.

In another embodiment of the present invention, the turbo powered propulsion drive comprises of a battery energy storage system 90 that is operatively connected to the power distribution unit 20 of the watercraft 100.

In yet another embodiment of the present invention, the penstock water conduit system will comprise of a screen 76 and a damper 78.

An advantage of the present invention is that it provides a new watercraft propulsion system that does not impact the environment and that is sustainable.

Another advantage of the present invention is that it provides a new watercraft propulsion system that does not rely on fossil fuels.

The embodiments of the turbo powered propulsion drive for watercrafts described herein are exemplary and numerous modifications, combinations, variations, and rearrangements can be readily envisioned to achieve an equivalent result, all of which are intended to be embraced within the scope of the appended claims. Further, nothing in the above-provided discussions of the turbo powered propulsion drive for watercrafts should be construed as limiting the invention to an embodiment or a combination of embodiments. The scope of the invention is defined by the description, drawings, and claims.

What is claimed is:

1. A turbo powered propulsion drive for watercrafts, the turbo powered propulsion drive comprises:

a motor controller that is attached to a watercraft, the motor controller directs power to either a permanent magnet synchronous motor, an inboard motor, a stern drive motor, or an outboard motor of the watercraft to propel the watercraft, a propeller is attached to either the permanent magnet synchronous motor, the inboard motor, the stern drive motor, or the outboard motor of the watercraft, the propeller propels the watercraft;

a power distribution unit that is attached to a hull of the watercraft, the power distribution unit is operatively connected to the motor controller;

a wind turbine controller that is attached to the hull, the wind turbine controller is operatively connected to the power distribution unit;

a permanent magnet synchronous motor wind power generator that is attached to the watercraft, the permanent magnet synchronous motor wind power generator is operatively connected to the power distribution unit;

a wind turbine that is attached to a top section of the watercraft, the wind turbine is operatively connected to the permanent magnet synchronous motor wind power generator;

a hydroelectric generator controller that is attached to the hull, the hydroelectric generator controller is operatively connected to the power distribution unit;

a permanent magnet synchronous motor power generator that is attached to the hull, the permanent magnet synchronous motor power generator is operatively connected to the hydroelectric generator controller;

a turbine is coupled to the permanent magnet synchronous motor power generator;

a penstock water conduit system that is attached to an outer bottom section of the watercraft, the penstock water conduit system feeds the turbine with a pressurized fluid flow that is generated by the watercraft when the watercraft moves in a forward direction; and an engine control unit that operatively is connected to the power distribution unit.

2. The turbo powered propulsion drive for watercrafts of claim 1, wherein the engine control unit is comprised of a multi-function display that is touch screen and that allows the watercraft to be controlled, a radar, and a depth finder.

3. The turbo powered propulsion drive for watercrafts of claim 1, the turbo powered propulsion drive comprises of a battery energy storage system that is operatively connected to the power distribution unit of the watercraft.

4. The turbo powered propulsion drive for watercrafts of claim 1, wherein the wind turbine is a vertical axis wind turbine.

\* \* \* \* \*